(12) United States Patent
Zhang et al.

(10) Patent No.: US 7,725,638 B2
(45) Date of Patent: May 25, 2010

(54) APPLICATION PROCESSOR CIRCUIT INCORPORATING BOTH SD HOST AND SLAVE FUNCTIONS AND ELECTRONIC DEVICE INCLUDING SAME

(75) Inventors: Li Zhang, Suzhou (CN); Su-fen Wei, Suzhou (CN); Yan Xiao, Suzhou (CN)

(73) Assignee: Freescale Semiconductor, Inc., Austin, TX (US)

( * ) Notice: Subject to any disclaimer, the term of this patent is extended or adjusted under 35 U.S.C. 154(b) by 128 days.

(21) Appl. No.: 11/838,209

(22) Filed: Aug. 13, 2007

(65) Prior Publication Data

US 2008/0059679 A1 Mar. 6, 2008

(30) Foreign Application Priority Data

Sep. 1, 2006 (CN) .................... 2006 1 0126706

(51) Int. Cl.
*H05K 7/10* (2006.01)
(52) U.S. Cl. .................................... 710/301; 710/62
(58) Field of Classification Search ......... 710/301–304, 710/62–64
See application file for complete search history.

(56) References Cited

U.S. PATENT DOCUMENTS

| | | | | |
|---|---|---|---|---|
| 4,945,548 A * | 7/1990 | Iannarone et al. | ........... | 375/214 |
| 6,941,405 B2 * | 9/2005 | Morrow | ........... | 710/305 |
| 7,028,109 B2 * | 4/2006 | Saito et al. | ........... | 710/33 |
| 7,028,111 B2 * | 4/2006 | Chang et al. | ........... | 710/52 |
| 7,039,826 B2 * | 5/2006 | Saito et al. | ........... | 713/601 |
| 7,269,669 B2 * | 9/2007 | Liu et al. | ........... | 710/8 |
| 7,272,676 B2 * | 9/2007 | Saito et al. | ........... | 710/52 |
| 7,397,273 B1 * | 7/2008 | Ng et al. | ........... | 326/38 |
| 7,461,318 B2 * | 12/2008 | Fukae et al. | ........... | 714/749 |
| 2004/0019732 A1 * | 1/2004 | Overtoom et al. | ........... | 710/313 |
| 2005/0144385 A1 * | 6/2005 | Mowery et al. | ........... | 711/115 |
| 2005/0197017 A1 | 9/2005 | Chou et al. | | |
| 2005/0228281 A1 * | 10/2005 | Nefos | ........... | 600/446 |
| 2006/0047860 A1 | 3/2006 | Lin | | |
| 2006/0059289 A1 * | 3/2006 | Ng et al. | ........... | 710/305 |
| 2006/0172606 A1 * | 8/2006 | Irisawa | ........... | 439/630 |
| 2006/0218324 A1 | 9/2006 | Zayas | | |
| 2006/0288377 A1 * | 12/2006 | Hsieh | ........... | 725/76 |
| 2007/0138305 A1 | 6/2007 | Ito | | |

* cited by examiner

*Primary Examiner*—Paul R Myers
(74) *Attorney, Agent, or Firm*—Charles Bergere

(57) ABSTRACT

An application processor circuit has SD-compatible interface protocols and can perform both host and slave functions. The circuit includes SD bus interface logic for realizing SD interface signals defined in SD-compatible interface protocols; system bus interface logic for performing the interface function on the system bus side; a data buffer for adjusting the data transfer rate difference between the SD bus interface and the system bus interface; a data buffer controller for controlling access to the data buffer; and a configuration unit for configuring the circuit to work in the host mode or slave mode. The SD-compatible interface protocols include MMC/SD/SDIO protocol, high speed MMC/SD/SDIO protocol, and CE-ATA interface protocol. The SD host logic and slave logic are incorporated in a single module to support both the SD host and slave functions, so as to achieve more convenient data transfer between electronic devices.

13 Claims, 9 Drawing Sheets

APPLICATION PROCESSOR CIRCUIT INCORPORATING BOTH SD HOST AND SLAVE FUNCTIONS AND ELECTRONIC DEVICE INCLUDING SAME

BACKGROUND OF THE INVENTION

The present invention relates to high speed data transfer between electronic devices. More specifically, the present invention relates to an application processor circuit compliant with MMC/SD/SDIO protocol, and to a portable electronic device including the application processor circuit.

The application processors in more and more portable electronic devices, e.g., personal digital assistance (PDA), portable music player and notebook computer, support interfaces compliant with MMC/SD/SDIO protocol, since these interfaces can achieve high efficiency in data transfer and are easy to use. The PDA devices, for example, implement some functions by means of external cards connected via an SD card slot to provide a variety of choices to the user and enable the user to configure the PDA device. These functions not only include expansion of the memory capacity of the PDA device, but also include other PDA functions that support connections with various other peripheral devices. Specifically, for example, SD (Secure Digital) memory card is widely used to expand the memory capacity of the PDA devices. The increasingly popular SDIO (Secure Digital Input/Output) card is based on the SD memory card, and is compatible therewith in terms of electrical and mechanical configuration. The common functions of SDIO card include Bluetooth adapter, WLAN adaptor, GPS receives, and so on. In addition, the SDIO specification has introduced the concept of "SDCombo", which refers to a combination of both SD memory card and SDIO card functions. The SD card slot of existing PDA devices can support the SD memory card and SDIO card, and can also support MMC (Multimedia Card), and the MMC protocol is an earlier developed memory card specification than the SD specification. Incidentally, in the context of the present application, concepts such as "SD protocol", "SD interface" and the like are used in many cases to represent the MMC/SD/SDIO protocol, so as to make the description more concise.

Existing application processor chips supporting the SD interface only include SD host logic to support SD slave device, but cannot achieve interconnection therebetween via such interfaces. For example, the existing PDA devices with SD slots only have SD host logic to support SD slave devices such as MMC card, SD memory card, SDIO card and SDCombo card. However, two PDA devices cannot enable data exchange therebetween though the SD interface. The existing data transfer compliant with SD protocol can only be done between a host and a slave device, but in practical use, it may be desirable to conduct data transfer between any two devices which support SD protocol, e.g., between two chips within the same package, or between two PDA devices which exchange data therebetween. Thus, there exists a need that an electronic device incorporating application processor chip, e.g., PDA, can serve both as a SD host and as a SD slave device, so as to provide more convenience in the data transfer.

U.S. Patent Application No. 2005/0197017A1 uses SD protocol, but the application relates to a new protocol which, based on the SD protocol, inquires about the conventional protocols that the apparatus supports. However, the apparatus itself still serves as a host controller, and is irrelevant to the slave device.

SUMMARY OF THE INVENTION

An object of the present invention is to solve the above-mentioned problem in the prior art, and provide an application processor circuit that incorporates both the SD slave logic and the SD host logic into a single module, and a portable electronic device including the application processor circuit, so as to support both the SD host function and the SD slave function and achieve more convenient data transfer between the electronic devices.

In order to achieve the object of the invention, in one embodiment of the present invention a mature design of high speed SD host and the SD slave device are combined, taking full advantage of and improving those modules with common functions between the SD host and SD slave, so as to achieve the combination of these two in an economic and effective way.

According to one aspect of the present invention, there is provided an application processor circuit, following SD-compatible interface protocols and configurable to perform both host function and slave function, the circuit comprising: a SD bus interface logic for realizing SD interface signals defined in SD-compatible interface protocols; a system bus interface logic for performing the interface function on system bus side; a data buffer for adjusting the data transfer rate difference between the SD bus interface and the system bus interface; a data buffer controller for controlling effective access to the data buffer; and a configuration unit for configuring the circuit to work in the host mode or slave mode.

The "SD compatible" interface protocols concerned in the present invention include one or more of the following protocols: MMC protocol, SD protocol, SDIO protocol, high speed MMC protocol, high speed SD protocol, high speed SDIO protocol, and CE-ATA interface protocol.

According to another aspect of the present invention, there is provided a portable electronic device, which includes the application processor circuit in accordance with the first aspect of the present invention.

Unlike U.S. Patent Application No. 2005/0197017A1, which incorporates a set of protocols into SD protocol, the application processor circuit in accordance with the present invention maintains the SD protocol as it is, and combines both the SD host function and the SD slave card function, so as to achieve the capacity of OTG (On-The-Go), which means that the device can serve both as a host and as a slave device. Therefore, the application processor circuit according to the present invention can also be referred to as "SD-OTG" circuit or briefly as "OTG" circuit.

The portable electronic device in accordance with the present invention, such as a PDA, depending on the software and/or hardware configuration, can serve as a host controller to support high speed MMC/SD/SDIO card on the one hand, and as a high speed MMC card, a high speed SD card, or a high speed SDIO card on the other hand. Since a card that incorporates both SD function and SDIO function is usually referred to as a "SDCombo" card, the device of the present invention also can be called "high speed MMC/SDCombo OTG" device. Therefore, the application processor circuit, or even the PDA device itself, can serve as a MMC card, a SD card, or a SDIO card, which provides all of its interfaces and memory space to another SD host controller. In other words, a PDA device implementing the present invention can serve as a Bluetooth adapter, a WLAN adapter, and so on.

With the capability of serving as both a host and a slave device, the application processor circuit can act as a master side or a slave side of the data interface. Thus, data exchange between chips within the same package, devices on board, or two electronic devices can be performed by means of SD interface with small data width, simple protocol and high data throughput. When a number of IP cores are integrated on a single chip, this provides greater flexibility. For example, when a chip incorporates a USB-OTG core and a SD-OTG core of the present invention, any SD host controller can access the USB device via the chip. On the other hand, any USB host controller may access the MMC/SD/SDIO/SD-Combo card via the chip. Therefore, the processor chip implementing the present invention can be used more widely.

Application processors having an MMC/SD/SDIO host controller may take advantage of the present invention. The present invention provides a new choice for chip interconnection and a bus bridge based on the SD bus.

BRIEF DESCRIPTION OF THE DRAWINGS

The above and other features and advantages the present invention will become more apparent by means of description of the preferred embodiment with reference to the accompanying drawings, wherein the same or similar elements are indicated by the same or similar reference numbers.

DETAILED DESCRIPTION OF THE INVENTION

Figure 1:
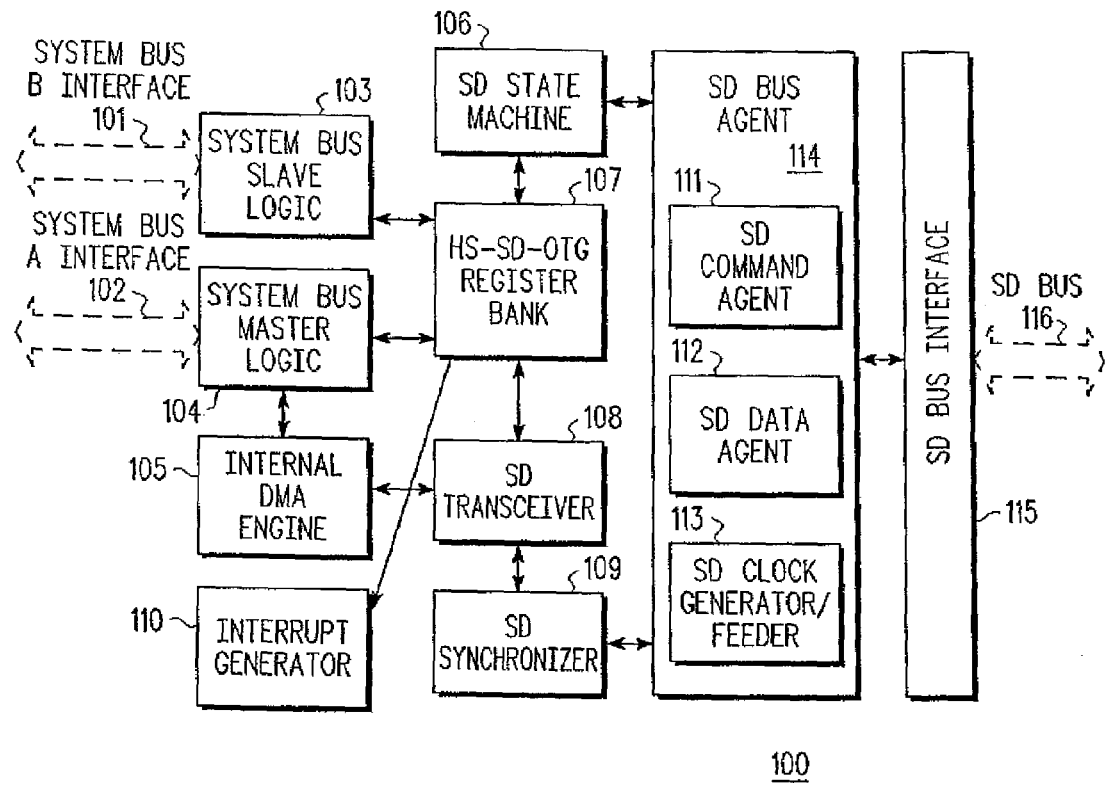
FIG. 1 is a schematic block diagram illustrating the architecture of an application processor circuit according to one embodiment of the present invention.

FIG. 1 illustrates generally the architecture of an application processor circuit 100 according to one embodiment of the present invention. The circuit 100 works in two bus domains, i.e., the system bus domain shown on the left side, and the SD bus domain shown on the right side of FIG. 1. In FIG. 1, system bus A interface 102 is used for data transfer. System bus A interface 102 is connected to system bus master logic 104. In FIG. 1, system bus B interface 101 is used for the configuration of a register bank (the configuration of the register bank is explained below). The system bus B interface 101 is connected to system bus slave logic 103. During data transfer by means of system bus A, system bus master logic 104 is used to select the devices on system bus A with which it conducts data transfer and is used to start data transfer. In one embodiment, separate system buses A and B are used respectively for configuration of functional modules and data transfer, to improve performance. On the other hand, where only functional requirements are taken into account, it is feasible to use the same system bus for implementing both the configuration of functional modules and data transfer.

Since the data transfer on system bus A is initiated by system bus master logic 104, according to the preferred embodiment, system bus master logic 104 exchanges data with internal DMA engine 105. The internal DMA engine 105 performs the data transfer independently to reduce the workload of the system processor. The introduction of the internal DMA engine 105 can significantly improve the data throughput.

When transferring data between the system bus and the SD bus, due to the difference between the data transfer rate on different buses, a data buffer is needed to accommodate the rate differences therebetween. In addition, when the system bus interface and the SD bus interface are in different clock domains, the synchronization of data, command and control signals between different clock domains is needed. To this end, a SD synchronizer 109 is provided between the internal DMA engine 105 and the SD bus 116. The SD synchronizer 109 includes a data buffer (not shown in the figures), which is used for data synchronization between different clock domains. The SD synchronizer 109 also includes synchronization logic for command and control signals, so as to realize the synchronization of command and control signals between different clock domains. According to another embodiment, when the system bus and the SD bus meet certain requirements, the SD synchronizer 109 can be simplified as including the data buffer only. The data buffer is shared between the slave mode and the host mode. The size of the shared part depends on the application requirement, and the data buffer is not necessarily used entirely in both modes.

In addition, the circuit 100 also has a SD transceiver 108 which comprises synchronizer control logic to ensure effective access to the SD synchronizer 109. SD transceiver 108 controls the address signals of the data buffer in the SD synchronizer 109, and, before delivering the data from the SD bus interface 115 to the data buffer, conducts protocol conversion for the data, so as to realize the data transmission/receiving between the two interface domains. Similarly, the SD transceiver 108 can also be simply implemented as a data buffer controller for controlling effective access to the data buffer. In the host mode and slave mode, a single data buffer controller can be used to control effective access to the data buffer so as to prevent read failure or write overflow. Alternatively, separate data buffer controllers can be used in host mode and slave mode for controlling effective access to the data buffer.

As explained above, according to the preferred embodiment of the present invention, the system bus master logic 104 and the internal DMA engine 105 are implemented as separate functional modules, and the data buffer and the data buffer controller are implemented in SD synchronizer 109 and SD transceiver 108 respectively. However, those skilled in the art can appreciate that, the present invention is not limited to this. For example, when only the simplest functions are needed, the synchronization between different clock domains and the performance criteria of data throughput may not be taken into account. Therefore, the system bus master logic, the DMA engine, the SD transceiver and the SD synchronizer can also be implemented by a single system bus logic module which involves only the simplest functions.

As shown in FIG. 1, the SD transceiver 108, the SD synchronizer 109 and the SD state machine 106 are connected to SD bus agent 114 in the circuit 100 in the preferred embodiment of the present invention. The SD bus agent 114 is used to perform serial-parallel conversion on the command line and the data line, add and detect starting/ending bit, and perform CRC operation, and the like.

Figure 5:
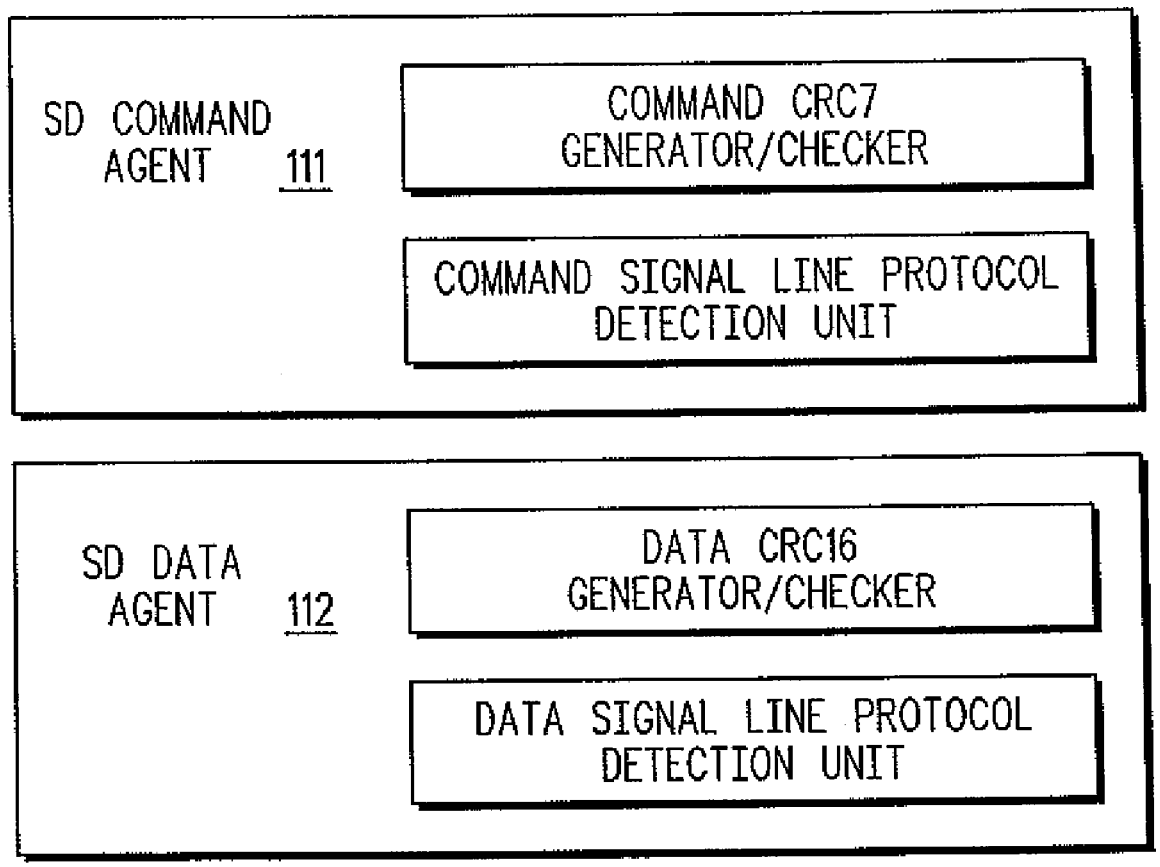
FIG. 5 is a functional block diagram of the SD command agent and the SD data agent in FIG. 1.

The SD bus agent 114 includes three sub-modules: SD command agent 111, SD data agent 112 and SD clock generator/feeder 113. The SD command agent 111 and SD data agent 112 realize the signal sequences on the command line and the data line as per the requirements of SD specification. FIG. 5 shows the functional block diagram of the SD command agent 111 and SD data agent 112. Specifically, SD command agent 111 includes a command CRC7 generator/checker for performing the CRC7 generation and check and the serial-parallel conversion in the command signals, and includes a command signal line protocol detection unit. SD data agent 112 includes a data CRC16 generator/checker for performing the CRC16 generation and check and the serial-parallel conversion in the data signals, and includes a data signal line protocol detection unit.

SD Clock generator/feeder 113, depending upon the configuration of the circuit 100, drives a clock at given frequency on the SD bus interface 115 in the host mode, and feeds the clock on the SD bus interface 115 to the modules within the circuit 100 in the slave mode. The SD clock generator/feeder 113 performs division, gating, inversion and shaping of the clock on the SD bus interface 115.

Figure 2:
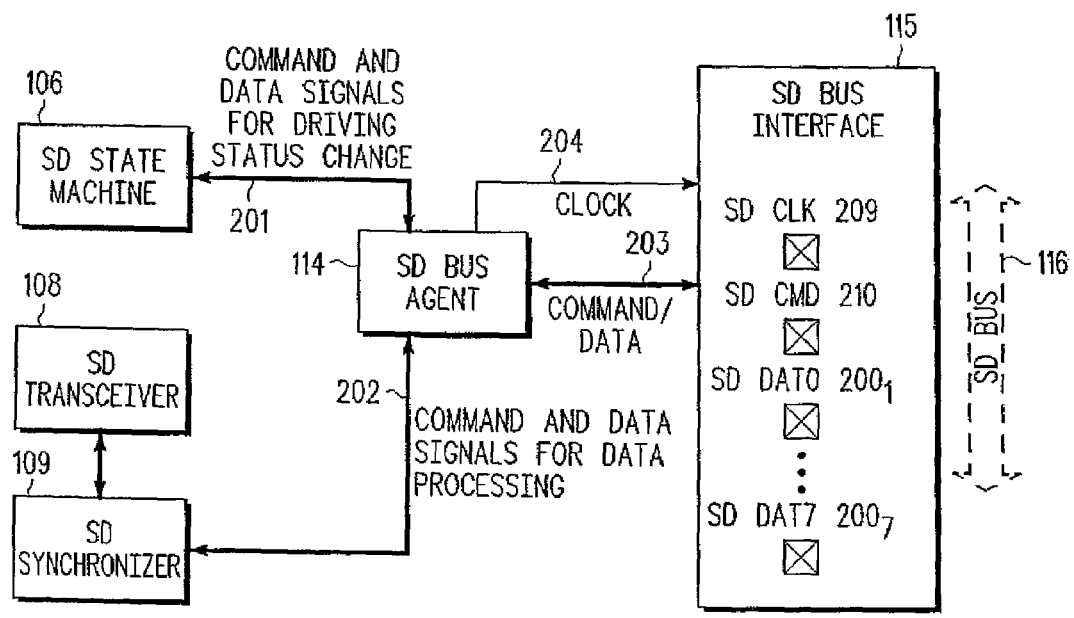
FIG. 2 is a schematic block diagram illustrating the interconnection relationships among the SD bus agent and other modules in FIG. 1.
Figure 3:
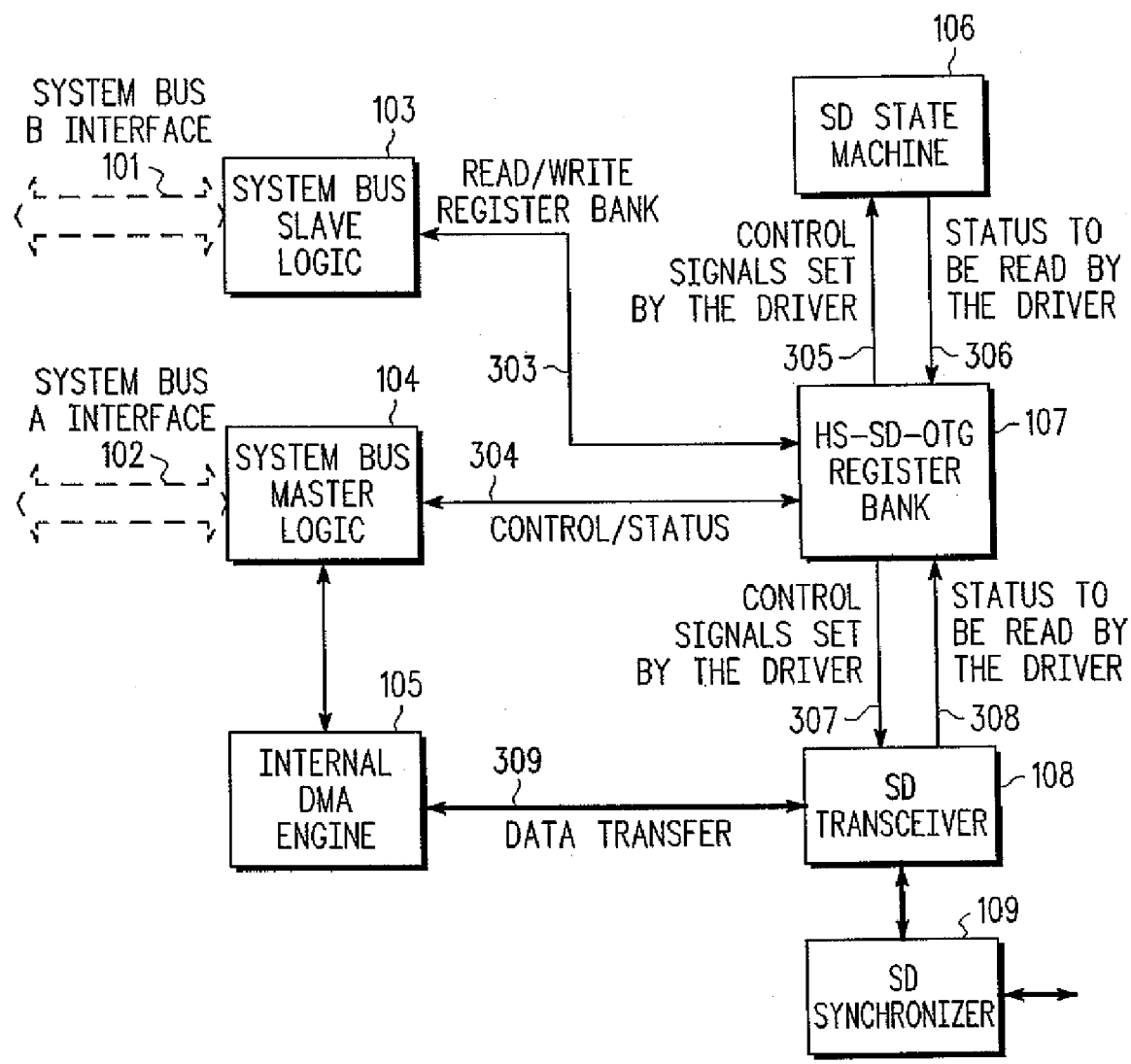
FIG. 3 is a schematic block diagram illustrating the interconnection relationships among the register bank, the system bus logic and other modules in FIG. 1.

From FIGS. 2 and 3, the interconnection among the SD transceiver 108 and SD synchronizer 109 and the system bus master logic 104 and SD bus agent 114. The SD transceiver 108 is used to coordinate the data and command information. Upon receiving the original data sent from the SD bus agent 114, the SD transceiver 108 decides whether to submit the data to the DMA engine 105 which in turn sends the data to the upper level of the system via the system bus A, based on the information provided by the SD bus agent 114, such as the correctness of the data and whether it is during the gap between the data blocks. On the other hand, the SD transceiver 108 provides corresponding control signals to SD bus agent 114 according to the status signal given by the SD state machine 106. In addition, the SD transceiver 108 also controls the SD clock generator/feeder module 113 in the SD bus agent 114 on basis of the received response to the command, and may also decide the commands to be sent by the SD command agent 111, e.g. CMD12, to control the data and command transfer on the SD bus 116. SD synchronizer 109 is a synchronization mechanism introduced to accommodate the system bus and the SD bus working in different clock domains. As explained above, the SD synchronizer 109 includes a data buffer for accommodating the data rate difference between the two bus domains, so as to ensure reliable interaction between the modules in the two clock domains.

The SD bus agent 114, on basis of the command and data signal received, interacts with SD state machine 106 and SD synchronizer 109 via data/command lines 201 and 202 respectively. Specifically, SD bus agent 114, based on the commands, the corresponding response signals and the status of data line, enables the SD state machine 106 to enter corresponding logic status and output control signal corresponding to the status. The command and data used for data processing are sent into SD synchronizer 109, SD synchronizer 109 performs synchronization processing on the command/response and data, which are then delivered to the upper level of the system via the system bus A and submitted to the driver layer.

FIG. 2 also shows that SD bus agent 114 exchanges command, data and clock signals with SD bus interface 115 via clock line 204 and command/data line 203. SD bus interface 115 includes a command interface, i.e., SD CMD 210, a clock interface, i.e., SD CLK 209, and eight data interfaces collectively represented by reference number 200, i.e., SD DATA0 $200_1$-SD DATA7 $200_7$. Some optional interfaces are also listed in SD specification, including write protection, card plug in/out detection, Open-Drain signal line status enable, etc. These interfaces are not necessary for implementing SD specification, although they can also be shared between the host function and the slave function. For sake of simplicity, these interfaces are not shown in FIG. 2.

FIG. 1 also shows HS-SD-OTG (High Speed SD On-The-Go) register bank module 107, which provides a programming interface for software control and polling. SD specification defines a set of necessary registers. In the register bank 107, those features common to the host function and the slave function, e.g., RCA, OCR register, DMA starting address and the size and number of transfer data block, can also be shared. It should be noted that, in the preferred embodiment, the present invention is described in conjunction with of SoC, i.e., chip system containing MCU (Micro Control Unit). In such case, the register bank 107 is necessary. However, for circuits without a MCU, i.e., circuits which do not need to support a driver, can also implement the present invention. For example, some low cost SD host controllers do not contain MCU functions, instead, they implement the simplest host specification by means of pure electrical circuits to perform data exchange from system bus interface to SD host interface, while at the same time, the SD host controller can realize the function of SD slave device so as to perform data exchange with another SD host device, that is, the SD host controllers contain the "SD-OTG" circuit proposed by the present invention.

As shown in FIG. 1, the application processor circuit 100 contains an interrupt generator 110, which is coupled to the register bank 107 for informing driver layer of the working status of the circuit 100 in an interrupt manner and for requesting intervention of the drive.

FIG. 3 illustrates in more detail the interaction between the register bank 107 and the system bus logic and other sub-modules. When the MCU integrated on the SoC runs a driver, the hardware circuit structure corresponding to the program instructions, with the conversion of system bus slave logic 103 through the system bus, e.g., the system bus B for configuring the register bank 107, performs write operation on the registers in the register bank 107 via read/write signal line 303. This is the so called "configuration" operation, though which the contents of the registers are modified. The control signals set by the driver in this manner are sent to SD state machine 106 and SD transceiver 108 via control signal lines 305 and 307. On the other hand, during the operation of the circuit, the change in the status of SD state machine 106 and SD transceiver 108 modifies certain registers in the register bank 107 via status signal lines 306 and 308, as shown in FIG. 3. The driver, via the system bus B, reads the contents of these registers via the read/write signal line 303 under the control of system bus slave logic 103, so as to obtain the status of the circuit. Therefore, MCU realizes control over the circuit by running the driver to read/write the register bank 107 in this manner.

According to the preferred embodiment, whether the application circuit 100 works in the host mode or in the slave mode is configured before use through reading/writing the register bank 107 via system bus B by MCU on the SoC under the control of the driver in the above described manner. However, those skilled in the art can appreciate that the present invention is not limited to the software configuration by means of MCU on SoC, rather, there are alternative ways to carry out the configuration. Possible means include: a mechanical switch, corresponding to the host mode when being opened, and corresponding to the slave mode when being closed; an electronic exciter, e.g. an electronic button, wherein the circuit enters the host mode when being powered on, and switches to the slave mode when the electronic button is pressed, and switches back to the host mode when the electronic button is pressed again; wireless controlling means, e.g., infra controller, which switches to the slave mode when receiving a series of pulses, and switches back to the host mode when receiving a subsequent series of pulses; and other manners not limited to the above ones. Based on the configurable control signals, the host function or the slave function are activated correspondingly. It should be noted that, the configuration of host mode/slave mode can not only be made during the power on stage, but also can be made at any time as needed so as to allow dynamic selection of host function or slave function.

The SD state machine 106 in FIG. 1 is formed by combining the host state machine and the slave state machine. The configuration mode of the OTG circuit of the present invention decides the behavior of the SD state machine 106. When the OTG circuit is configured as a slave device, the SD state machines works in the slave mode. When the OTG circuit is configured as a host, the SD state machine 106 works in the host mode.

The state machine in slave mode includes four possible implementations, which comprise those based on MMC protocol, SD memory card protocol, SDIO protocol, and SDCombo protocol incorporating both SD memory and SDIO. The specifications of these implementations are defined in the following standards:

The MultiMediaCard System Specification, Version 4.0, MMCA Technical Committee;

SD Specifications Part 1, Physical Layer Specification, Version 2.00 Draft, Nov. 9, 2005, Technical Committee, SD Card Association;

SD Specifications Part E1, SDIO Specification, Version 1.20 Draft Jul. 8, 2005, Technical Committee, SD Card Association.

Figure 4A:
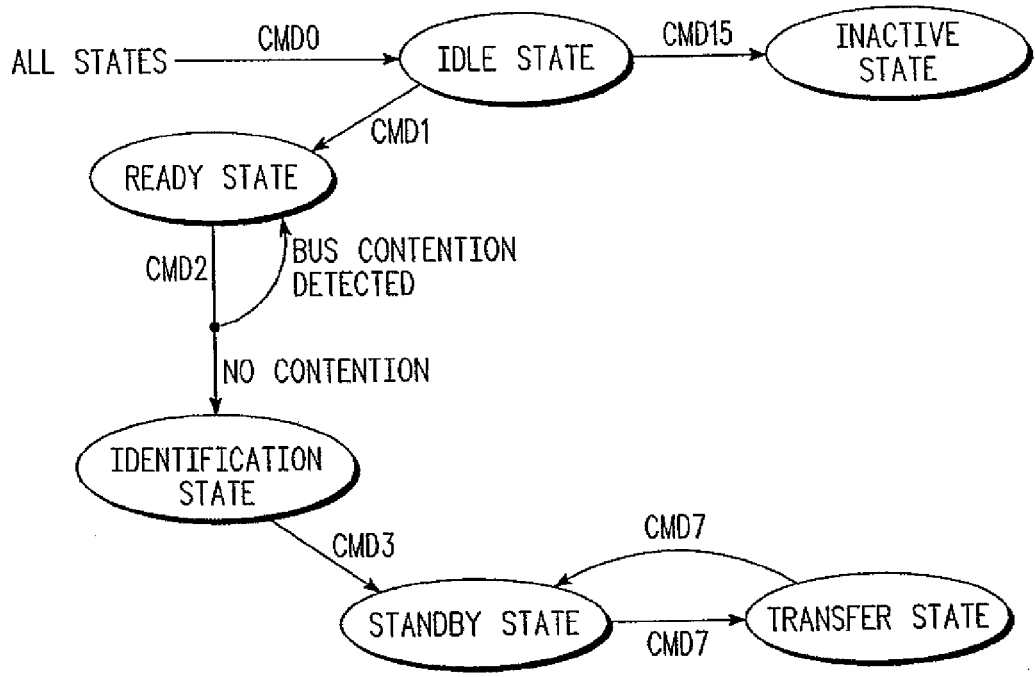
FIGS. 4A-4D illustrate an exemplary manner of implementing SD card state, SD host state and SD-OTG state in an embodiment of the present invention.
Figure 4B:
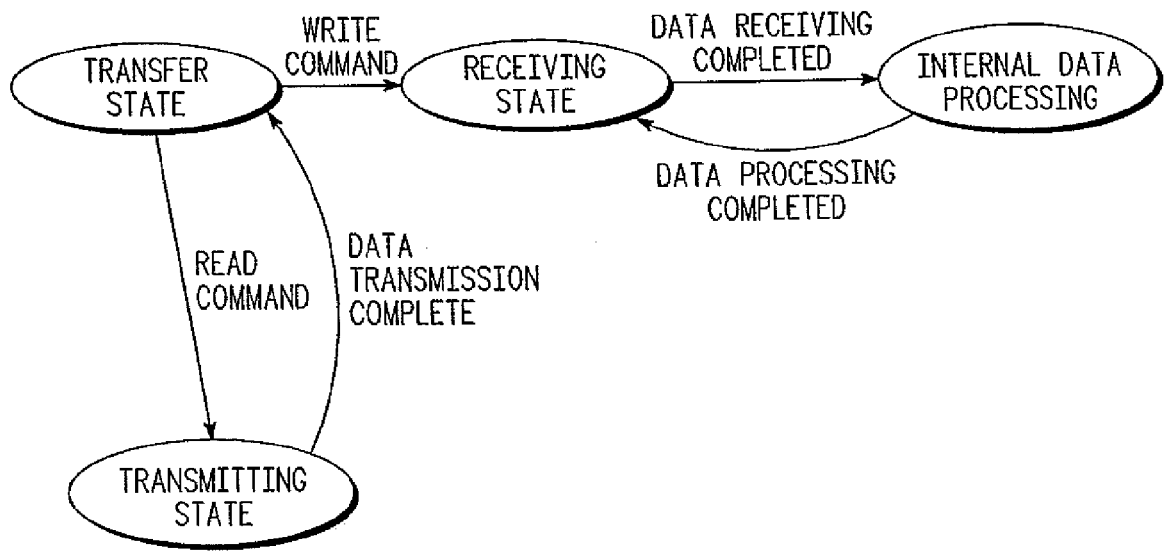

FIGS. 4A and 4B illustrate the card state in MMC protocol during the initialization and during normal operation, respectively.

Figure 4C:
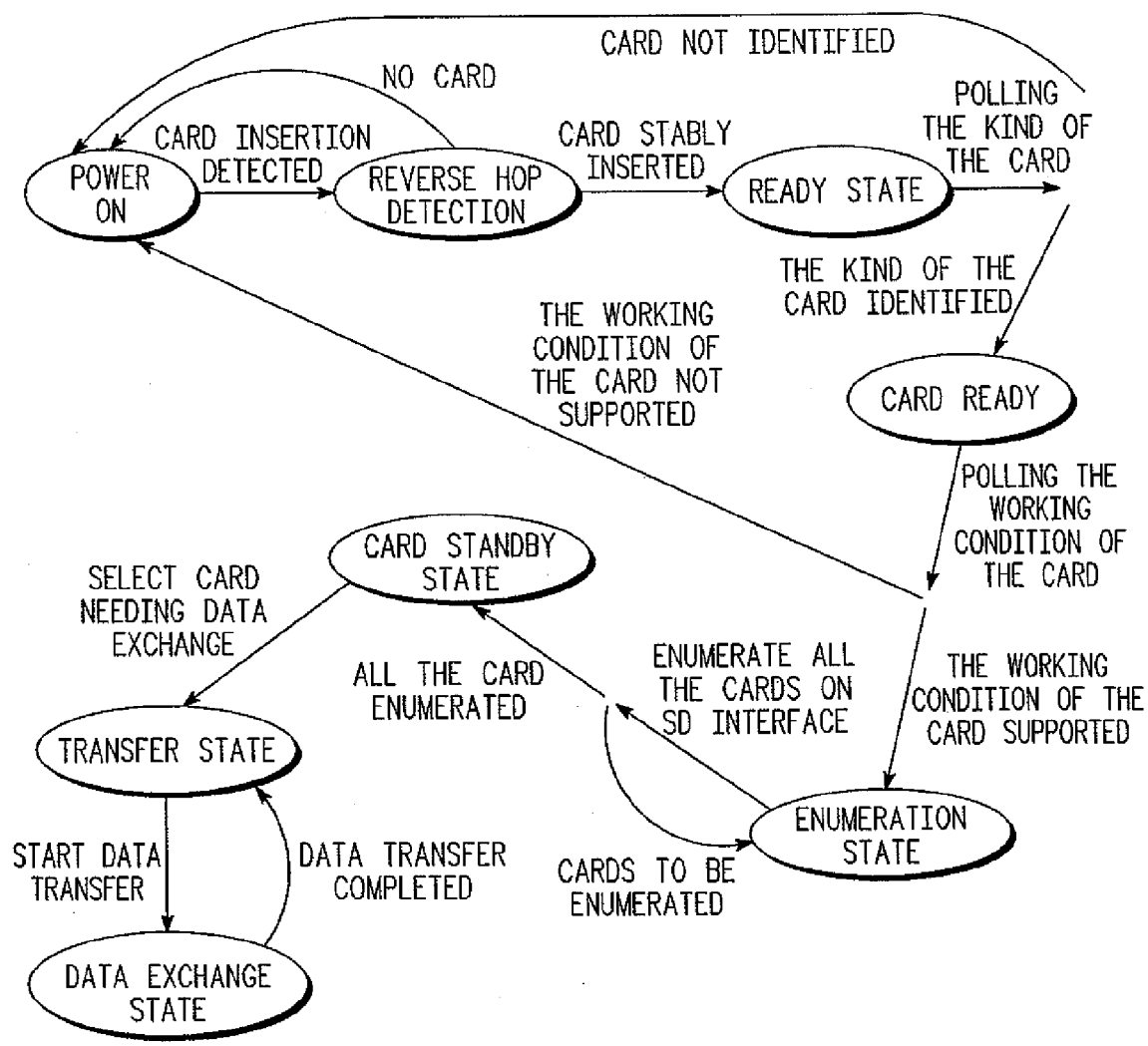

The implementation of the host state machine is defined in the following standard: SD Specification Part A2, SD Host Controller Standard Specification, Version 2.00 Draft, Jul. 29 2005, Technical Committee, SD Card Association. FIG. 4C illustrates the SD host state machine.

Figure 4D:
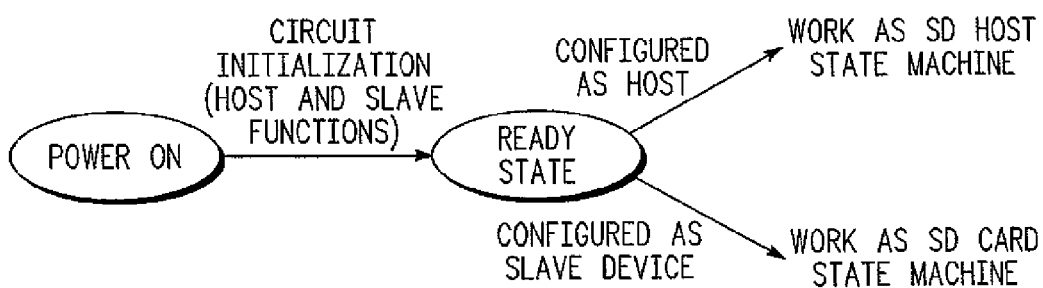

FIG. 4D illustrates the SD OTG state machine, as can be seen, the state machine is formed by combining the host state machine and the slave logic state machine. After the system is powered on, the circuit is initialized and enters the ready state. Then, depending upon the configuration of the circuit, the SD OTG state machine works in the mode of SD host state machine or in the mode of SD card (slave logic) state machine.

Figure 6A:
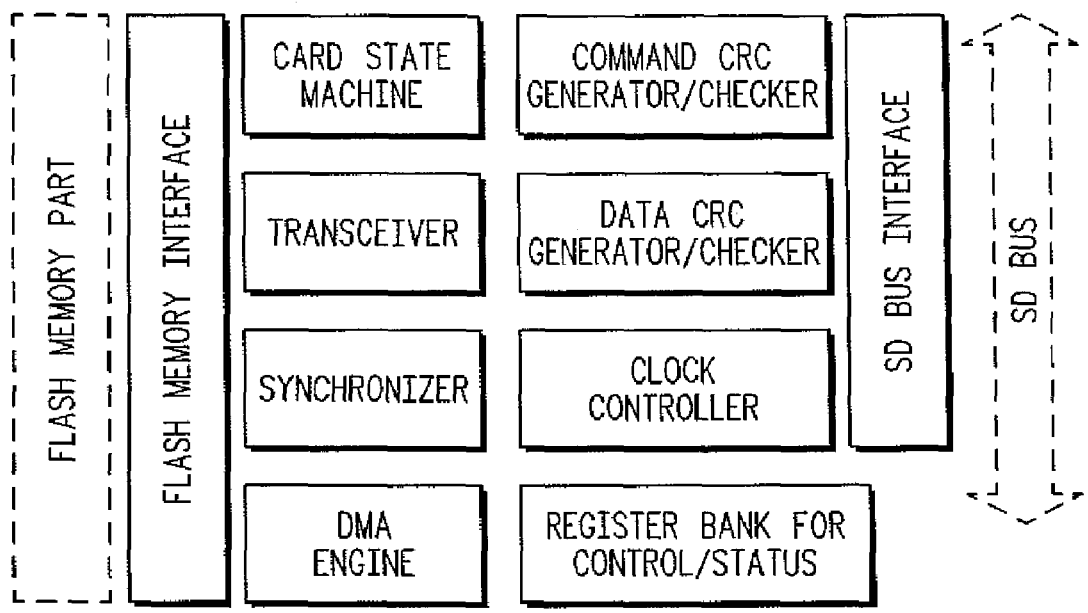
FIGS. 6A-6C are functional block diagrams of typical SD slave devices, which correspond to applications directed to SD memory card, SD bus bridge, and non-SD compatible attachment device, respectively.
Figure 6B:
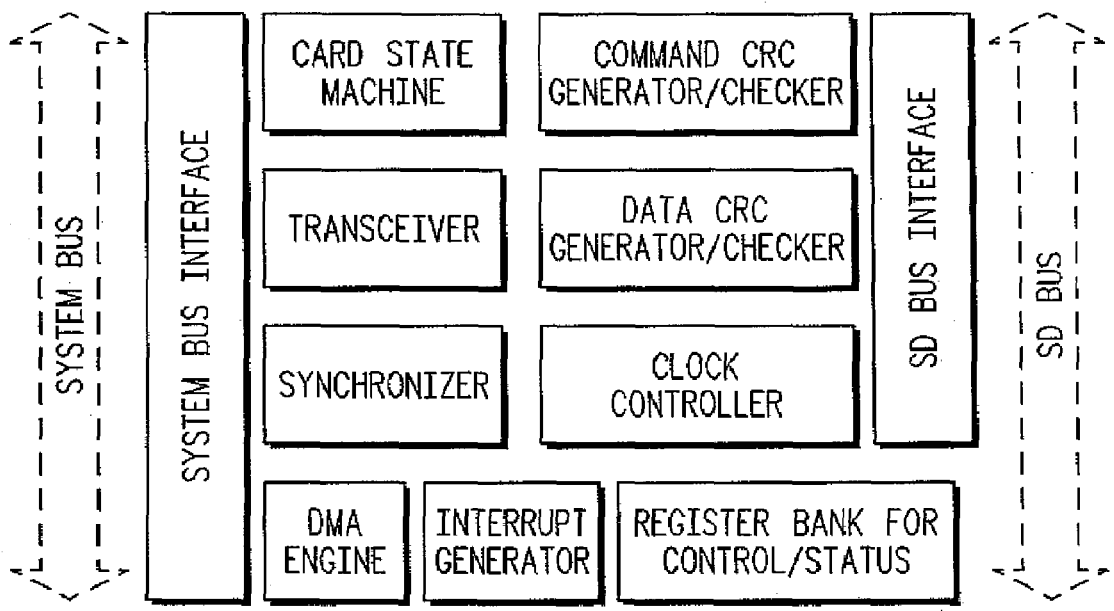
Figure 6C:
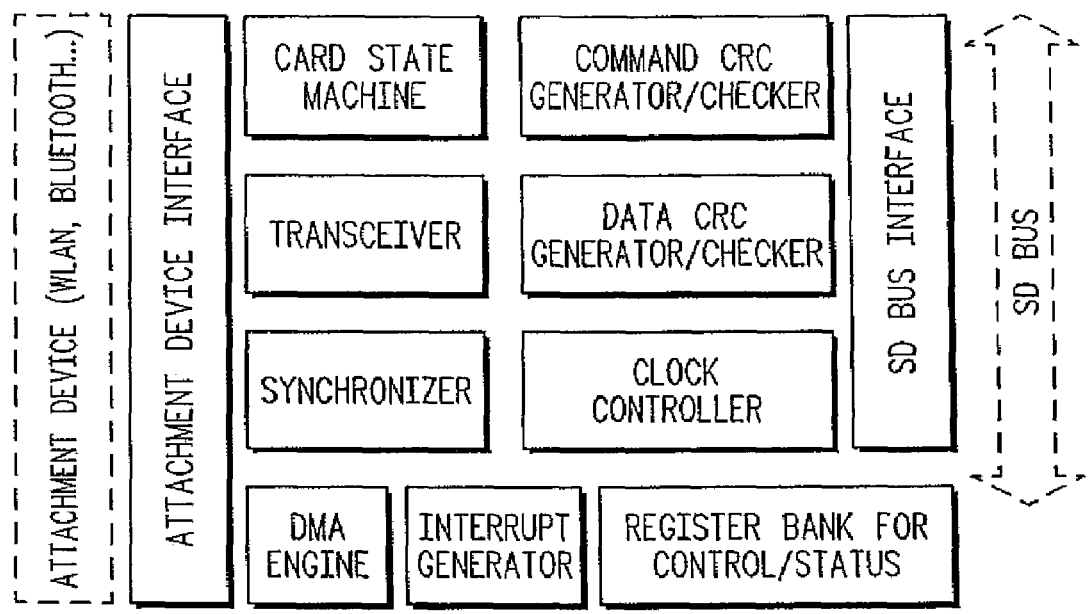

FIGS. 6A-6C illustrate the functional block diagrams of the OTG circuit 100 of the present invention when serving as typical SD slave devices, which correspond to applications directed to SD memory card, SD bus bridge, and non-SD compatible attachment device, respectively. It should be noted that, the blocks surrounded by solid lines are functional modules, which may be shared between the host function and the slave function. The blocks surrounded by dash lines are concepts concerning connection, which are not constituent parts of the functional circuit.

As shown in FIGS. 6A-6C, when the OTG circuit 100 serves as typical SD slave devices, it comprises the following functional modules:

Card state machine: Receive various commands and responses in different states, and change its state according to the commands or responses received.

Synchronizer: Include a data buffer for compensating different data transfer rates between the system bus side and the SD bus side.

Transceiver: Control safe access to the data buffer. Since the read and write accesses to the data buffer come from different clock domains, the transceiver needs to handle address synchronization.

DMA engine: For high speed data throughput, the DAM engine is often used on the system bus side, enabling effective data read/write. Command CRC generator & checker: Generate command CRC7 checksum, and check command CRC7 result.

Data CRC generator & checker: Generate data CRC16 checksum, and check data CRC16 result.

SD bus interface: Realize the physical connection between the internal logic modules and the external SD device.

Register bank: Provide programming interface for software control and polling.

Clock controller: Realize gating, division and inversion of clock, so as to convert the original clock source for internal use. For simple device design, whether the SD memory card or SD bus bridge, the clock controller can be omitted.

Interrupt generator: According to the requirements of the host system, some statuses must be acknowledged and reported. This is usually performed by the interrupt mechanism. The interrupt generator can also wake up the host system depending upon the system low power strategy. For SD memory card, the interrupt mechanism is not needed.

Flash memory interface (FIG. 6A): If the SD slave device is a SD memory card, it includes a flash memory interface, which is a controller module for enabling correct access to the flash memory part.

System bus interface (FIG. 6B): If the SD slave device is a SD bus bridge, in order to transfer data between the system bus and external SD bus, the system bus interface is needed to handle bus transactions.

Attachment device interfaces (FIG. 6C): If the SD slave device is a SDIO card, it includes the other side device interface, such as WLAN interface and Bluetooth interface.

Figure 6D:
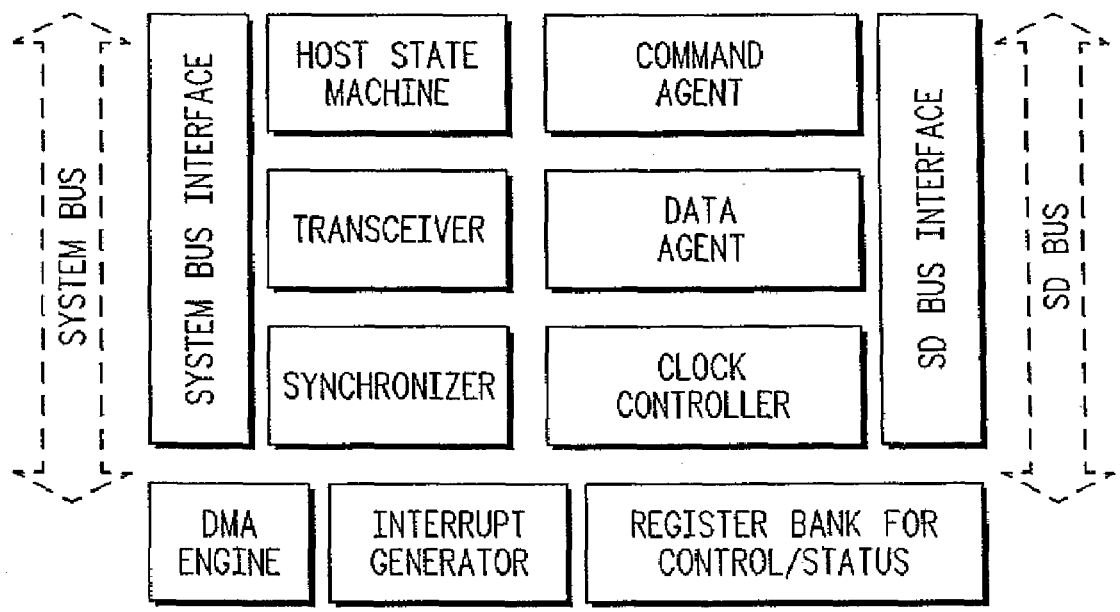
FIG. 6D is a functional block diagram of a typical host controller.

FIG. 6D illustrates the functional block diagram of the OTG circuit 100 of the present invention when serving as a typical SD host controller.

As shown in FIG. 6D, a typical SD host controller comprises the following functional modules:

Host state machine: Receive various commands and responses in different states, and change its state according to the commands or responses received, card interrupt, and the change of its internal working status such as the completion of data transfer.

Synchronizer: Include a data buffer for compensating different data transfer rates between the system bus side and the SD bus side.

Transceiver: Control safe access to the data buffer. Since the read and write accesses to the data buffer often come from different clock domains, the transceiver needs to handle address synchronization.

DMA engine: For high speed data throughput, the DAM engine is often used on the system bus side, enabling effective data read/write.

Command agent: Generate command CRC7 checksum and check command CRC7 result, and perform bottom level electrical processing such as serial-parallel conversion, generate and check the starting bit/ending bit of the command signal line, and monitor the signal line conflict.

Data agent: Generate data CRC16 checksum and check data CRC16 result, and perform bottom level electrical processing such as serial-parallel conversion, generate and check the starting bit/ending bit of the data signal line, monitor the signal line conflict, and generate read-wait, busy signals.

SD bus interface: An analog function part for reliable connection between the SD functional modules and SD card, including pads, internal pull-up resister, etc.

Register bank: Provide programming interface for software control and polling.

Clock controller: Realize gating, division, inversion of clock and other functions, so as to output clock drive bus signal at given frequency in the host mode. Since the clock must be turned off during data buffer danger, the clock control module is necessary.

System bus interface: An interface for handling system bus transactions. The system bus may adopt any industrial standards or corporation private standard, such as AHB, Freescale IP bus, etc.

Interrupt generator: According to the requirements of the host system, some statuses must be acknowledged and reported. This is usually performed by the interrupt mechanism. The interrupt generator can also wake up the host system depending upon the system low power strategy. For SD memory card, the interrupt mechanism is not needed.

In addition, the host state machine may also include the card state sequence. This is an optional implementation, since the hardware part may not care what the current card state is—instead, it is to be handled by the driver. However, the SD host controller may include this module and send card command sequence, especially in the case where the master logic is implemented by pure hardware circuit.

Figure 7A:
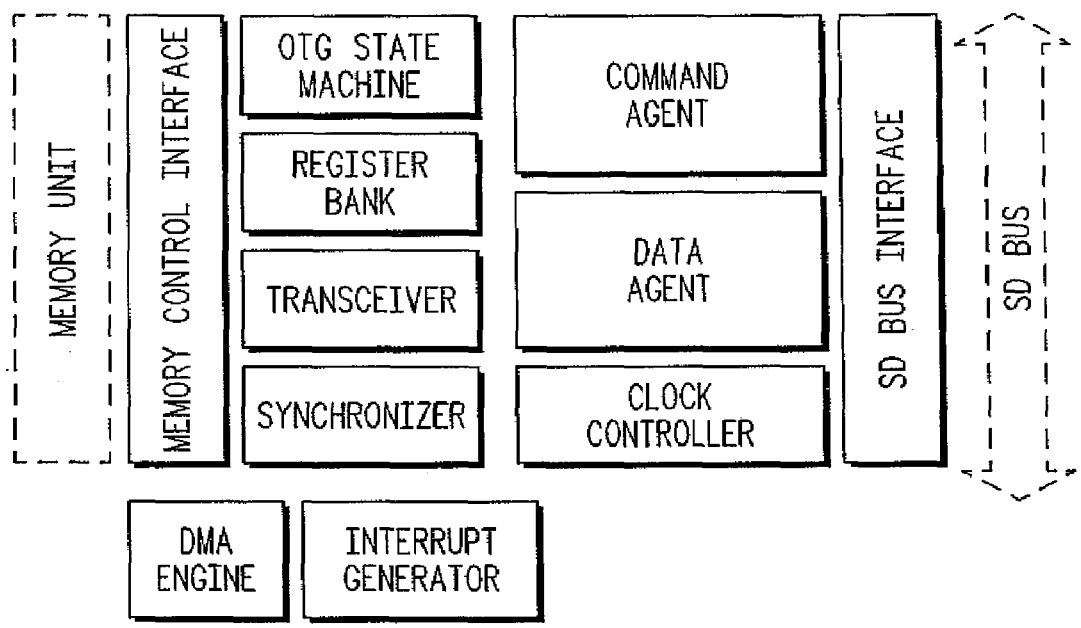
FIGS. 7A-7C are functional block diagrams of a SD Combo OTG controller, when involving the SD slave device applications as shown in FIGS. 6A, 6B and 6C respectively, in accordance with the embodiment shown in FIG. 1.
Figure 7B:
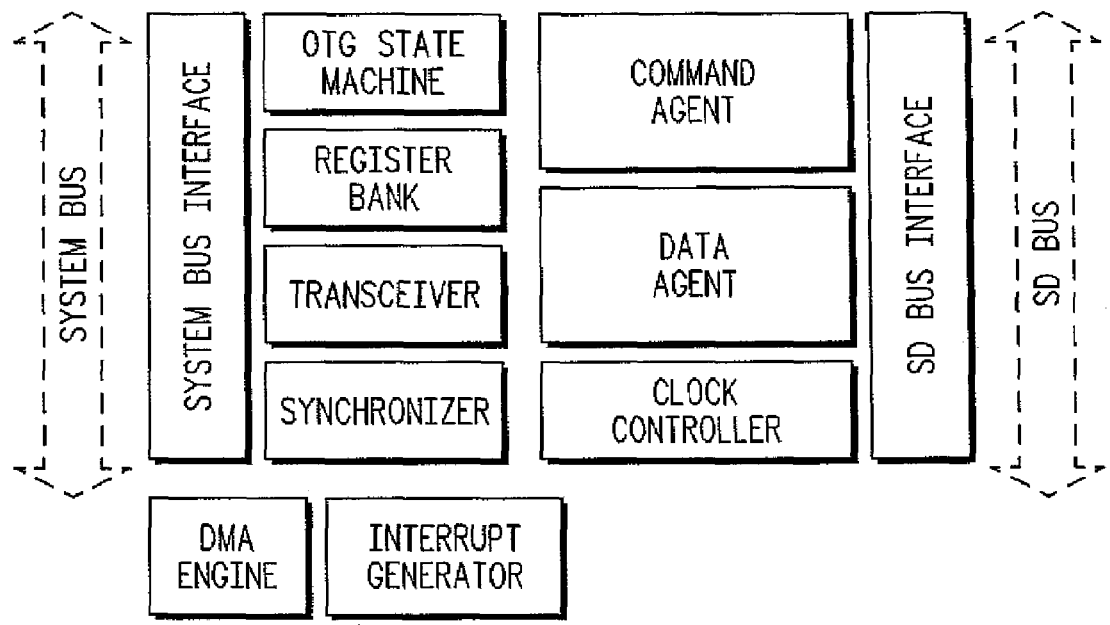
Figure 7C:
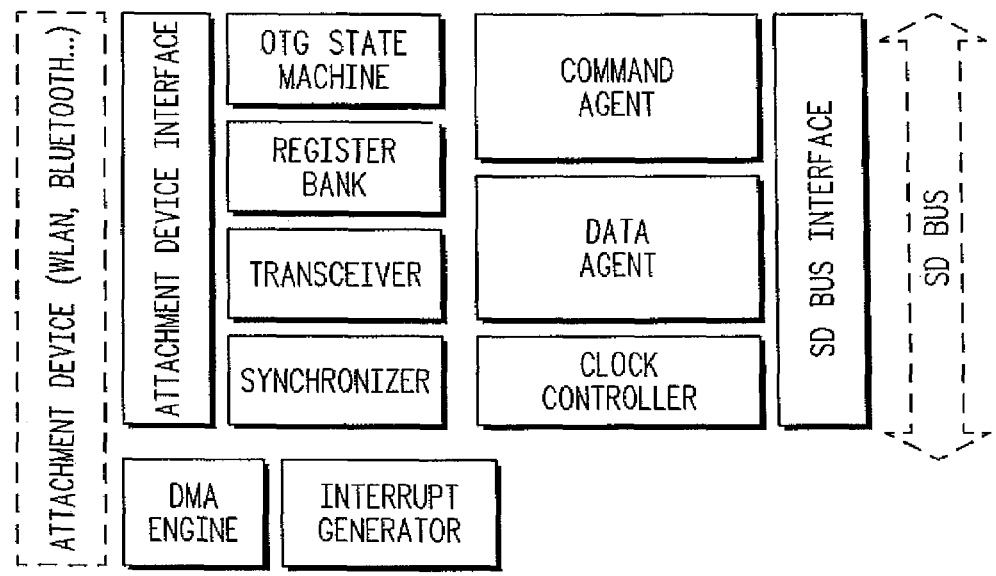

FIGS. 7A-7C illustrate the functional block diagrams of a novel SD Combo OTG controller, when involving the SD slave device applications as shown in FIGS. 6A, 6B and 6C respectively, on basis of the embodiment as shown in FIG. 1.

As shown in FIGS. 7A-7C, the SD Combo OTG controller comprises the following functional modules:

OTG state machine: Work in the host mode or the slave mode depending on the configuration. It includes card state sequence, which is necessary for slave device function, but the host can share the card state sequence to provide more smart control. The OTG state machine changes its state according to the various commands or responses received in different states and relevant control signals on the data line.

Synchronizer: For synchronizing various interactive signals between the system bus clock domain and SD bus clock domain. It includes a data buffer for compensating different data transfer rates between the two sides. Since SD slave device needs larger buffer size, the buffer here is usually larger than the buffer in the host controller. Thus, the sharing of the buffer will bring significant advantages.

Transceiver: Generate control signals on the data line, such as the read-wait control signal in host mode, and "busy">indication signal in the slave mode, and so on. It is also used to automatically send commands in the host mode, e.g., to automatically send CMD12. The transceiver also includes control logic for the data buffer so as to ensure effective access to the data buffer.

DMA engine: For high speed host SD controller and bus bridge (whose speed may exceed 400 Mbps), the DAM engine is widely used on the system bus side.

Command agent: Generate command CRC7 checksum and check command CRC7 result, and perform bottom level electrical processing such as serial-parallel conversion, generate and check the starting bit/ending bit of the command signal line, and monitor the signal line conflict.

Data agent: Generate data CRC16 checksum and check data CRC16 result, and perform bottom level electrical processing such as serial-parallel conversion, generate and check the starting bit/ending bit of the data signal line, monitor the signal line conflict, and generate read-wait and busy signals.

Clock controller: For the host part, the clock controller is necessary. However, the slave device can share this module to provide more features such as power save and internal frequency division.

Register bank: Provide programming interface for software control and polling.

SD bus interface: Since the SD bus is an external bus outside the system, the SD bus interface is used to realize electrical analog (in contrast to digital logic) function.

Interrupt generator: According to the requirements of the host system, some statuses must be acknowledged and reported. This is usually performed by the interrupt mechanism. The interrupt generator can also wake up the host system depending upon the system low power strategy.

Memory controller interface (FIG. 7A): When the SD Combo is obtained by incorporating SD memory card into master logic, the memory control interface originally used for accessing the memory unit needs to be maintained. System bus interface (FIG. 7B): When the SD Combo is used for bus bridge, the system bus interface is used to realize the interface logic on the system bus side.

In summary, the advantage of the SDCombo controller lies in the sharing of all the possible functional modules, including system bus interface or memory controller interface, DMA engine, data buffer, buffer controller, SD state machine, clock controller, data & command CRC generator/checker, the combined register bank for realizing programming integrity and SD bus interface.

Some optional shared modules, including interrupt generator, provide enhanced features. Since SD and MMC standards are still under development and tend to support more advanced transfer policies such as wider data bus, higher speed, support for new device like CE-ATA, and more efficient data transfer (which is normally backwardly compatible), the modules supporting these new functions can also be shared between the host and the slave device. For example, the advanced DMA supporting the descriptor chain table has been proposed in the host controller specification draft, but this DMA can also be used in slave devices which are more efficient.

Figure 8:
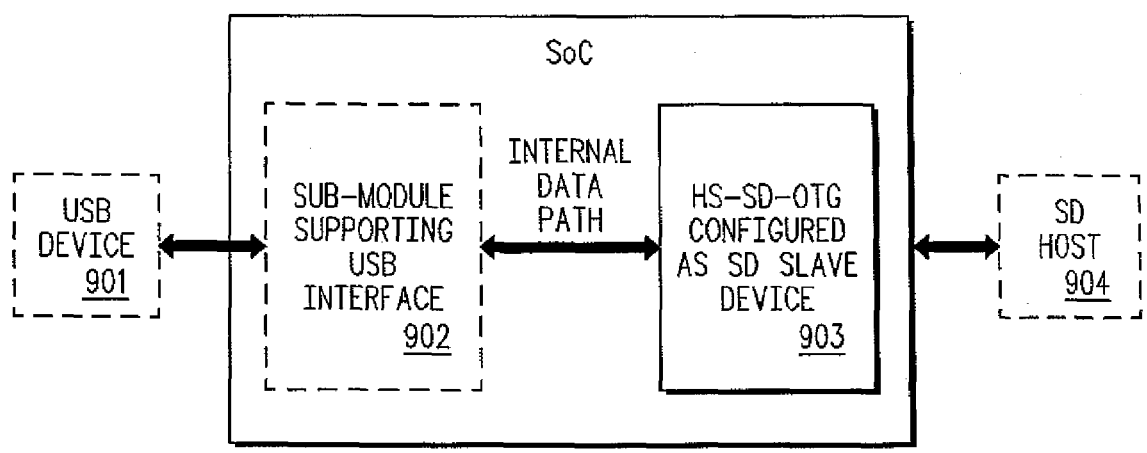
FIG. 8 illustrates the interconnection between an application processor chip of the present invention and a non-SD compatible device.

FIG. 8 illustrates the interconnection between the application processor chip of the present invention and a non-SD compatible device. When a SD-OTG core 903 of the present invention which is configured as a slave and a module 902 which supports USB interface are incorporated on the SoC chip 900, the SD host controller 904 can make access to the USB device 901 though the SoC chip 900.

The preferred embodiment of the present invention has bee descried in connection with SoC, i.e., the chip system comprising MCU, with reference to the drawings. However, those skilled in the art can appreciate that this is only for purpose of illustration but shall not be regarded as limitation to the present invention. Also, as mentioned above, in the context of the present application, terms like "SD bus interface" are used to explain the principle and exemplary implementations of the present invention for sake of simplicity, and MMC/SD/SDIO interfaces are not always mentioned. Those skilled in the art can appreciate that, this does not mean that the present invention can only apply to the interfaces compliant with SD protocol. Moreover, in the present application, concepts like "SD compatible protocol" are used to cover the MMC protocol, SD protocol, SDIO protocol, high speed MMC protocol, high speed SD protocol, high speed SDIO protocol, CE-ATA interface protocol, and future protocols compatible with these protocols.

It will be apparent to those skilled in the art that various changes and modifications can be made to the present invention without departing its spirit and scope. The protection scope of the present invention is only defined by the appended claims.

The invention claimed is:

1. An application processor circuit, following Secure Digital (SD) compatible interface protocols and configurable to perform both a host function and a slave function, the application processor circuit comprising:
   a SD bus interface logic for connection to an SD bus, for generating SD interface signals defined by the SD-compatible interface protocols;
   a system bus interface logic for connection to a system bus, for performing a system bus interface function;
   a data buffer, connected between the SD bus interface logic and the system bus interface logic, for adjusting a data transfer rate difference between the SD bus interface logic and the system bus interface logic;
   a data buffer controller, connected to the data buffer, for controlling access to the data buffer;
   a configuration unit for configuring the circuit to perform the host function or the slave function;
   wherein the SD bus interface logic includes:
      a command agent for performing Cyclic Redundancy Check (CRC) generation and check, serial-parallel conversion of command signals, and generating and checking a starting bit and an ending bit of the command signals;
      a plurality of data agents each corresponding to a data line for performing CRC generation and check, serial-parallel conversion of data signals, and generating and checking a starting bit and an ending bit in the data signals; and
      a clock controller for driving clock signals on the SD bus when the application processor circuit performs the host function and for feeding the clock signals on the SD bus to the application processor circuit when the application processor circuit performs the slave function, and wherein the clock controller is used to perform one or more of division, gating, inversion and shaping of the clock on the SD bus; and
   a state machine, connected to the SD bus interface logic, that operates in a host mode and in a slave mode depending on the configuration of the application processor circuit, and controls the command agent and the plurality of data agents.

2. The application processor circuit of claim 1, wherein the SD-compatible interface protocols include one or more of the following protocols:
   Multi-Media Card (MMC) protocol, SD protocol, Secure Digital Input/Output (SDIO) protocol, high speed MMC protocol, high speed SD protocol, high speed SDIO protocol, and Consumer Electronics Advanced Technology Attachment (CE-ATA) interface protocol.

3. The application processor circuit of claim 1, wherein the data buffer is shared between the host mode and the slave mode.

4. The application processor circuit of claim 1, wherein in the host mode and the slave mode, separate data buffer controllers are respectively used to control access to the data buffer to prevent read failure or write overflow.

5. The application processor circuit of claim 1, wherein in the host mode and the slave mode, a single data buffer controller is used to control access to the data buffer to prevent read failure or write overflow.

6. The application processor circuit of claim 1, wherein when the system bus interface logic and the SD bus interface logic operate in different clock domains, the data buffer is used for realizing data synchronization between said different clock domains, and wherein the application processor circuit further comprises synchronization logic for command and control signals to realize synchronization between said different clock domains.

7. The application processor circuit of claim 1, wherein the data buffer controller, in addition to controlling address signals of the data buffer, performs protocol conversion for the data from the SD bus interface before delivering said data to the data buffer, so as to realize data transmission/receiving between the system bus and the SD bus.

8. The application processor circuit of claim 1, further comprising:
   a register bank, connected between the SD bus interface logic and the system bus interface logic, for interfacing with the data buffer controller to provide a software control and polling function, and wherein the configuration unit is implemented by registers within the register bank.

9. The application processor circuit of claim 1, further comprising:
   a DMA engine, connected between the system bus logic and the data buffer, for independently performing data exchange between the system bus interface logic and the data buffer.

10. The application processor circuit of claim 1, wherein when the application processor circuit operates as a bus bridge and spans across the SD bus and the system bus, and wherein the system bus interface logic is used to enable data exchange on the system bus.

11. The application processor circuit of claim 1, wherein when the circuit is used as a memory device having a memory unit, the system bus interface logic enables access to the memory unit.

12. The application processor circuit of claim 1, wherein when the circuit is used as an adapter which converts a non-SD compatible attachment device to be compatible with the SD interface, the system bus interface logic enables access to the attachment device.

13. A portable electronic device, including the application processor circuit of claim 1.

* * * * *